No. 857,814. PATENTED JUNE 25, 1907.
F. H. LIPPINCOTT.
SYRUP DISPENSING APPARATUS.
APPLICATION FILED AUG. 18, 1904.

2 SHEETS—SHEET 1.

WITNESSES:
INVENTOR:
Fisher H. Lippincott,
BY
Joshua Pusey,
ATTORNEY.

No. 857,814. PATENTED JUNE 25, 1907.
F. H. LIPPINCOTT.
SYRUP DISPENSING APPARATUS.
APPLICATION FILED AUG. 18, 1904.

2 SHEETS—SHEET 2.

WITNESSES:
INVENTOR:
Fisher H. Lippincott,
BY
Joshua Pusey,
ATTORNEY.

UNITED STATES PATENT OFFICE.

FISHER H. LIPPINCOTT, OF PHILADELPHIA, PENNSYLVANIA, ASSIGNOR TO AMERICAN SODA FOUNTAIN COMPANY, OF BOSTON, MASSACHUSETTS, A CORPORATION OF NEW JERSEY.

SYRUP-DISPENSING APPARATUS.

No. 857,814.　　　　Specification of Letters Patent.　　　　Patented June 25, 1907.

Application filed August 18, 1904. Serial No. 221,216.

*To all whom it may concern:*

Be it known that I, FISHER H. LIPPINCOTT, a citizen of the United States, residing in the city and county of Philadelphia, in the State of Pennsylvania, have invented certain new and useful Improvements in Syrup-Dispensing Apparatus, of which the following is a full, clear, and exact description, reference being had to the accompanying drawings, of which—

My invention relates to apparatus for dispensing liquids and is particularly applicable to soda fountains as an adjunct thereof for the dispensing of such liquids as syrups or analogous ingredients for beverages.

Figure 1:
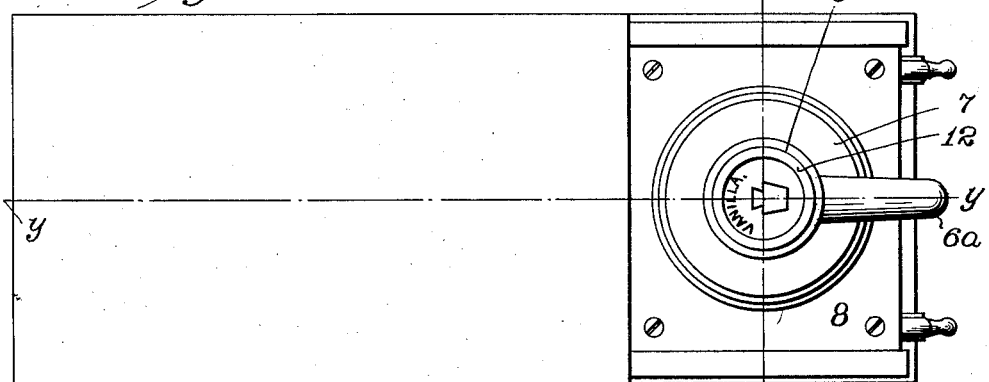
Figure 2:
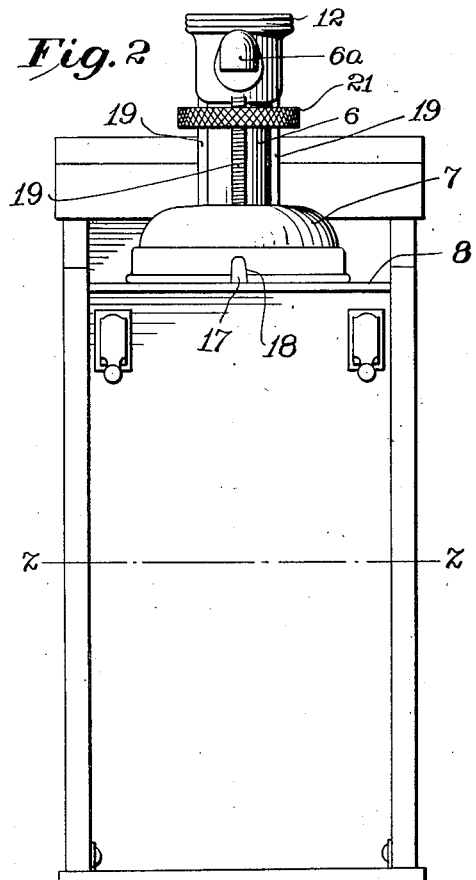
Figure 3:
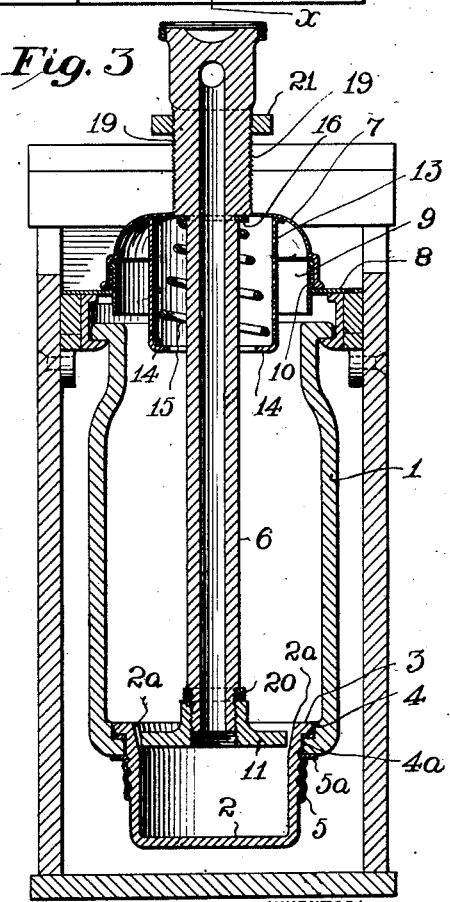
Figure 4:
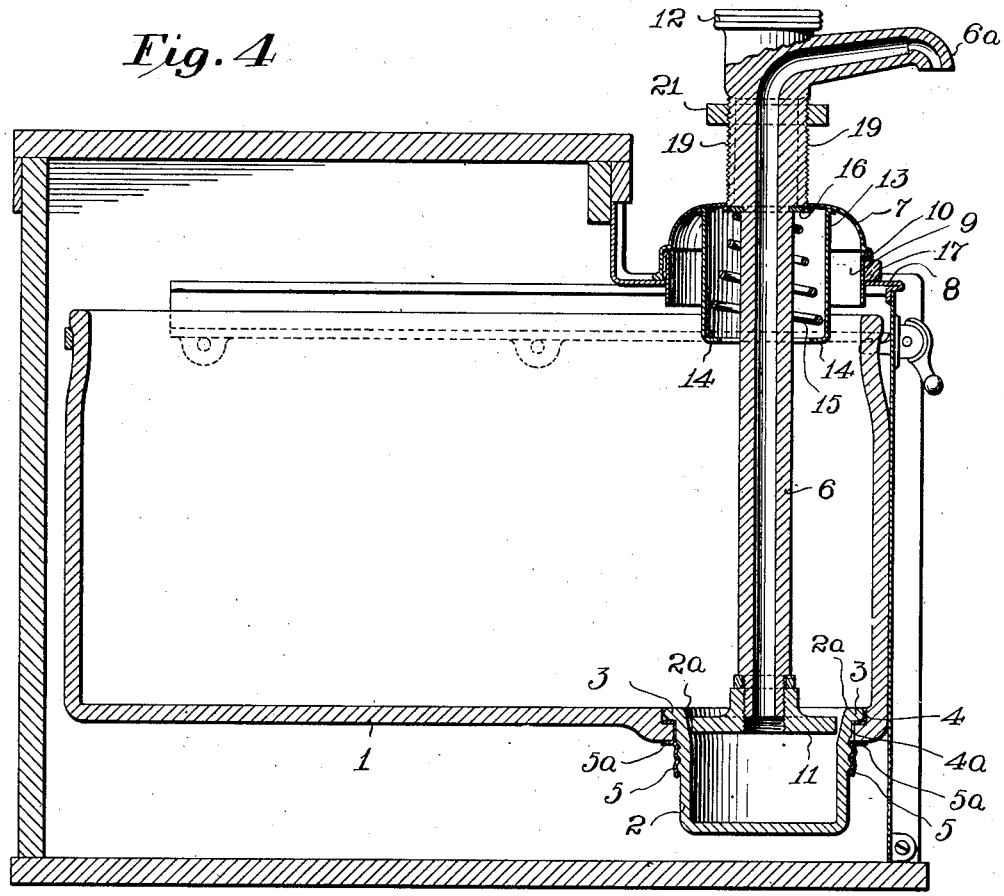
Figure 5:
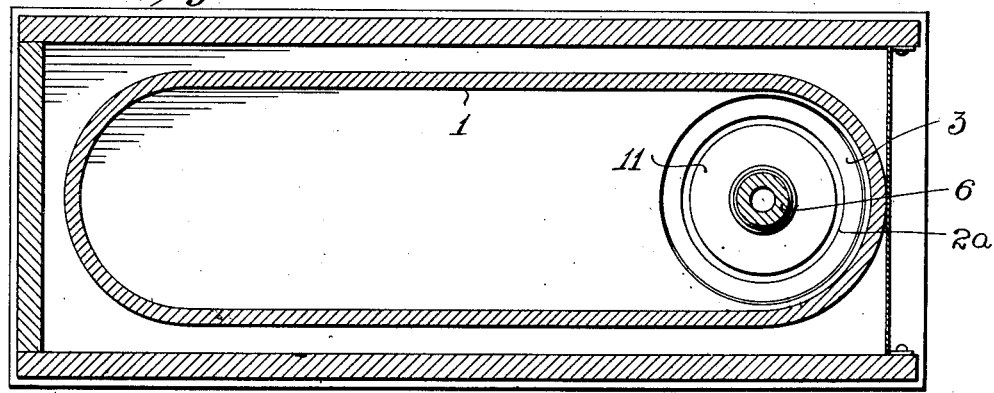

In the drawings hereto annexed which illustrate an embodiment of my invention and improvements, Figure 1 is a plan view of the apparatus; Fig. 2 is a front elevation thereof; Fig. 3 is a vertical section on the line $x$—$x$ of Fig. 1; Fig. 4 is a vertical section on the line $y$—$y$ of Fig. 1; and Fig. 5 is a horizontal section on the line $z$—$z$ of Fig. 2.

In the accompanying drawings 1 is a jar suitable as a reservoir for flavoring syrups and the like. At the bottom of the jar 1 and, in the form shown, near one end thereof, there is provided a well or measuring chamber 2. In the form of measuring chamber or well shown in the drawings, the sides thereof are substantially cylindrical except at the upper end where they flare outwardly (at 2ª) as seen in Figs. 3 and 4. This well or measuring chamber in the form shown in the drawings is made in a separate piece from the jar 1 and detachably secured thereto, the securement in the instance shown consisting in the provision of the upper end of the well or measuring chamber 2 with a peripheral flange 3 which is adapted to seat upon the lower surface of a circular recess 4 in the bottom of the jar, the said recess surrounding an opening in the latter. A portion of the periphery of the measuring chamber or well 2 is screw threaded and 5 is an annulus or thimble correspondingly screw threaded. In the form of apparatus shown, the measuring chamber or well is inserted through the opening in the bottom of the jar (marked 4ª in Figs. 3 and 4) from the inside of the jar and the flange 3 thereof brought to rest on the lower edge or bottom wall of the recess 4. The annulus 5 which has a flange 5ª at the top is screwed onto the measuring chamber or well until the said flange 5ª bears against the under side of the jar 1 thereby holding the measuring chamber 2 firmly in position.

The measuring chamber or well aforesaid performs its function by determining the amount of liquid which is expelled or dispensed at each operation of the mechanical devices which coöperate with the measuring chamber as will presently be explained.

6 is a plunger rod arranged to slide vertically in a lid or cover 7, the said cover being dome-shaped, in the form shown, and resting upon a part 8 of the top of the casing in which the syrup jar 1 is supported. The cover 7 closes over the opening 9 in the said casing. In order to maintain the cover 7 in place, I secure around the said opening 9 a vertical ring or flange 10 over which the lower part of the cover 7 fits.

Secured to the lower or inner end of the plunger rod and concentrically with the measuring chamber 2, there is a plunger 11 whereof the diameter is such that the plunger has a sliding fit with the cylindrical portion of the well or measuring chamber. In the form of my invention shown in the drawings, the plunger rod is made tubular so that it serves, as will presently be observed, the function of a conduit for the removal of displaced liquids as well as that of the means for imparting movement to the plunger 11.

The upper end of the plunger rod has, in the illustration shown in the drawings, a head or enlargement 12 which constitutes external operating means for the plunger as will hereinafter be described. A discharging nozzle 6ª is provided for delivering displaced liquid into the tumbler or other receptacle and in the illustration of my invention shown in the drawings, this nozzle 6ª constitutes a continuation of the tubular plunger rod. The nozzle 6ª by communicating with the conduit through which liquid displaced from the measuring chamber is expelled from the apparatus, serves to conduct said liquid to a convenient point for its final discharge and for this purpose the outer end of the nozzle is downwardly turned and projects preferably beyond the side of the casing as will be seen in Figs. 1 and 4.

The plunger rod passes through a hollow cylindrical chamber 13 which is formed in the lid or cover 7. The lower end of this chamber 13 has an internal flange 14 upon which is seated a spiral compression spring 15; the upper end of this spring which is contained within the chamber 13 bears against a collar 16 formed upon the plunger rod. This collar 16 acts also as a stop against the under side of the cover 7 to limit the upward movement of the plunger rod.

A lug 17 on the flange 10 in conjunction with the corresponding slot 19 in the side of the cover 7 serves to prevent the latter from turning; the plunger rod 6 is prevented from turning in the cover 7 by suitable means such, for example, as one or more splines 19 on the plunger rod, the said splines entering corresponding guide slots or notches in the cover 7. Thus the nozzle 6ª mounted on the tubular plunger rod will be maintained in its required position projecting over the edge of the casing.

Having described the construction of the aforesaid embodiment of my improvements (with the exception of certain means for effecting adjustment which I will hereafter allude to) I proceed to explain the mode of operation thereof. The jar 1 having been charged with syrup or other liquid. if it be desired to discharge or dispense a quantity of the liquid, say into a glass placed beneath the nozzle 6ª, the plunger rod, by means of the external operating knob 12, is forced down against the stress of the spring 15 thereby carrying the plunger 11 into the measuring chamber 2 and thus expelling the liquid from the measuring chamber into the conduit, provided in the present instance by the tubular plunger rod 6, and thence out through the nozzle 6ª. If the plunger 11 is made to expel its entire contents from the measuring chamber, the quantity of liquid delivered at the nozzle 6ª will correspond substantially to the excess of capacity of the measuring chamber over that of the conduit itself.

On releasing the plunger rod, the spring 15 will return it to the normal position shown in the drawings, whereupon the measuring chamber will again fill with syrup, the means for its refilling being shown in the specific illustration described as the annular orifice between the flaring mouth 2ª of the measuring chamber 2 and the plunger 11. When the liquid has become exhausted from the jar 1 the operator removes the cover 7 from the casing and withdraws therewith the displacement dispensing devices which, if desired, may be examined or cleaned, refills the jar 2 through the opening 9 and then replaces the cover 7 with its dispensing devices attached so that by mere replacement of this cover the operative mechanism is returned to its normal position in readiness to perform its functions.

Syrup jars are usually made of porcelain and therefore vary somewhat in dimensions and if, as in the apparatus shown for illustration of my improvements, a measuring chamber attached to the jar be employed, the distance of the bottom of such measuring chamber from the normal position of the plunger 11 may vary, and it is then desirable, in order that the plunger may occupy the proper position with relation to the measuring cup (i. e. just above the lower part of the flare 2ª), to make the plunger vertically adjustable upon the plunger rod. To this end I have shown the lower end of the plunger rod provided with a screw thread (Figs. 3 and 4), and the plunger 11 correspondingly threaded so that in effect the plunger 11 is a nut on the plunger rod. Thus the plunger may be set in any position of adjustment on the plunger rod and secured therein by means of a lock nut 20 (Fig. 3) on the plunger rod above the plunger. Also, in order to adjust the quantity of liquid which may be forced from the measuring chamber or well through the conduit in the plunger rod and delivered from the nozzle 6ª, I provide means for varying the reciprocating movement of the plunger rod and therefore of the plunger; in this instance I accomplish adjustment by means of a screw threaded nut 21, screw threading the splines 19 so that the nut may be adjusted up or down. This nut 21 stopping against the cover 7 limits the extent of downward movement of the plunger rod and plunger.

The casing shown in the drawings, whereof the piece marked 8 is a part of the top, supports the jar 1 in its interior. This casing as shown is suited to the reception of only one jar; but may obviously be enlarged if desired to contain more than one jar.

The interior of the casing should in practice be kept cold by ice or other refrigerating means, in order to keep the syrups in the jars at the lower temperature desired. The arrangement of parts which is characteristic of my improvements lends itself especially to the economical maintenance of low temperature in the interior of the jar-containing casing, because the top of the casing as well as its sides and bottom is kept closed and the dispensation of syrups by means of my improvements does not interfere with this desired closed condition of the casing. The lid or cover 7 carries mounted in or on it the syrup displacing devices so that whenever it is desired to replenish the jar the only opening made through which cold air may escape from the casing is that which suffices to lift out the dispensing devices; and as this opening is on the upper part of the casing very little loss of refrigerant can result while the syrup jar is being refilled. Again the removal for cleansing of the displacing devices involves very little loss of refrigerant and when the cover 7 is replaced the apparatus is instantly ready for use. Further, it should be noted that the jars themselves, such as the jar 1 of the drawings, have no mechanism attached directly thereto so that it is easy to cleanse the jars or to substitute one jar for another, as no rearrangement of moving mechanical parts is necessary for either purpose.

What I claim is:

1. The combination of a jar open at the top, a stationary measuring chamber in the interior of the jar, a casing for the jar provided with an opening over the opening in the jar, a lid for the casing-opening supported by the casing, a tubular plunger-rod depending from and vertically movable in said lid, a plunger on the rod to reciprocate in the measuring chamber, and a delivery nozzle, in communication with the tubular plunger rod, to dispense liquid displaced by the plunger.

2. The combination of a casing, an opening in the top thereof, a jar within said casing having an opening registering with said casing-opening, a measuring chamber at the bottom of the jar, a detachable lid covering said casing opening, containing a hollow chamber and supported by the casing, a vertically movable, tubular plunger rod extending through said lid and chamber, a spring in said chamber to elevate the plunger-rod, and a plunger on the lower end of said rod to reciprocate in the measuring chamber.

3. The combination of a jar open at the top, a casing, supports therein for the jar, an opening in the casing above the open top of the jar, a removable cover for said opening, displacement dispensing devices, including a plunger, a conduit, an external delivery nozzle, and external operating means for the plunger, all carried by said cover and removable therewith from the jar and casing.

4. The combination of a jar, open at the top, a casing, supports therein for the jar, a well in the bottom of the jar, an opening in the casing directly over the said well, a removable cover for said opening, displacement dispensing devices, including a plunger, a conduit, an external delivery nozzle, and external operating means for the plunger, all carried by said cover, and removable therewith from the jar and casing.

5. The combination of a jar, open at the top, a casing, supports therein for the jar, a well at the bottom of the jar, an opening in the casing directly over said well, a removable cover for said opening, a plunger to cooperate by sliding fit with the side of said well to displace liquid therefrom, operating means external to said cover for the plunger, and a dispensing conduit leading from the well to a point external to said casing to deliver liquid displaced by the plunger from the well, the cover, plunger and operating means being removable as a unit from said jar and casing.

In testimony whereof, I have hereunto affixed my signature.

FISHER H. LIPPINCOTT.

Witnesses:
WILLIAM E. CHAPMAN,
WALTER C. PUSEY.